Oct. 31, 1961 E. G. NEWMAN 3,007,085

THREE-POSITION ELECTROMAGNETIC ACTUATOR

Filed April 17, 1959 2 Sheets-Sheet 1

THREE-POSITION ELECTROMAGNETIC ACTUATOR

Filed April 17, 1959 2 Sheets-Sheet 2

United States Patent Office 3,007,085
Patented Oct. 31, 1961

3,007,085
THREE-POSITION ELECTROMAGNETIC ACTUATOR

Ernest G. Newman, Poughkeepsie, N.Y., assignor to International Business Machines Corporation, New York, N. Y., a corporation of New York Filed Apr. 17, 1959, Ser. No. 807,171
11 Claims. (Cl. 317—138)

This invention relates to actuators of the electromagnetic type and has for an object the provision of a three-position electromagnetic actuator which is capable of high speed operation.

The present invention is particularly applicable to the actuation of the moving pulleys or pressure rollers in the drive system of tape recorders. The pressure rollers of magnetic tape units are adapted to be actuated for movement of the tape into engagement with a drive capstan or a stop capstan from an intermediate or neutral position. The tape is adapted to be transported through the unit at speeds in the order of one hundred inches per second. The present invention provides a compact actuator construction and has enabled the tape speed to be increased in the order of fifty percent without increasing the inter-record gap.

In accordance with the present invention there is provided a three-position electromagnetic actuator having an arm pivoted intermediate its ends to a support. An armature is pivoted intermediate its ends to the arm at a location spaced from the pivotal connection of the arm to the support. Two pairs of magnetic poles are arranged with respect to the armature so that one pair is disposed on either side of the armature. An additional pair of magnetic poles is provided so that one pole of the additional pair is associated with each of the two pairs of magnetic poles. The additional pair of magnetic poles is provided with an electrical winding adapted for energization to move the armature to a diagonal position and thus maintain the arm in a central position. Associated with the two pairs of poles are electrical means which are selectively energized to move the armature out of its diagonal position and into engagement with either pair of the first two pairs of magnetic poles so as to move the arm about its pivot in opposite directions to positions on either side of the central position.

When the electromagnetic actuator is employed in a tape drive system, the arm is provided at its outer end with a moving pulley which is positioned between a drive capstan and a stop capstan. When the armature is in its aforementioned diagonal position, the arm and thus the moving pulley are maintained in a neutral or central position between the drive capstan and the stop capstan. When either of the two pairs of magnetic poles is energized, the armature is attracted thereto causing the arm to be rotated about its fixed pivot and thereby moving the tape which passes over the moving pulley into engagement with the corresponding one of the capstans.

It is a further object of the invention to provide a six-pole electromagnetic actuator including three substantially U-shaped cores wherein the poles of one of the cores are disposed on diagonally opposite sides of the armature for the actuator. The present invention is a species of the multi-position electromagnetic actuator described and generically claimed in copending application, Serial No. 807,172, filed April 17, 1959, by H. K. Baumeister and assigned to the same assignee as the present application.

For other objects and advantages and for a more detailed description of the invention, reference is to be had to the following description taken in conjunction with the accompanying drawings in which.

Figures 1, 2, 2A, 3:
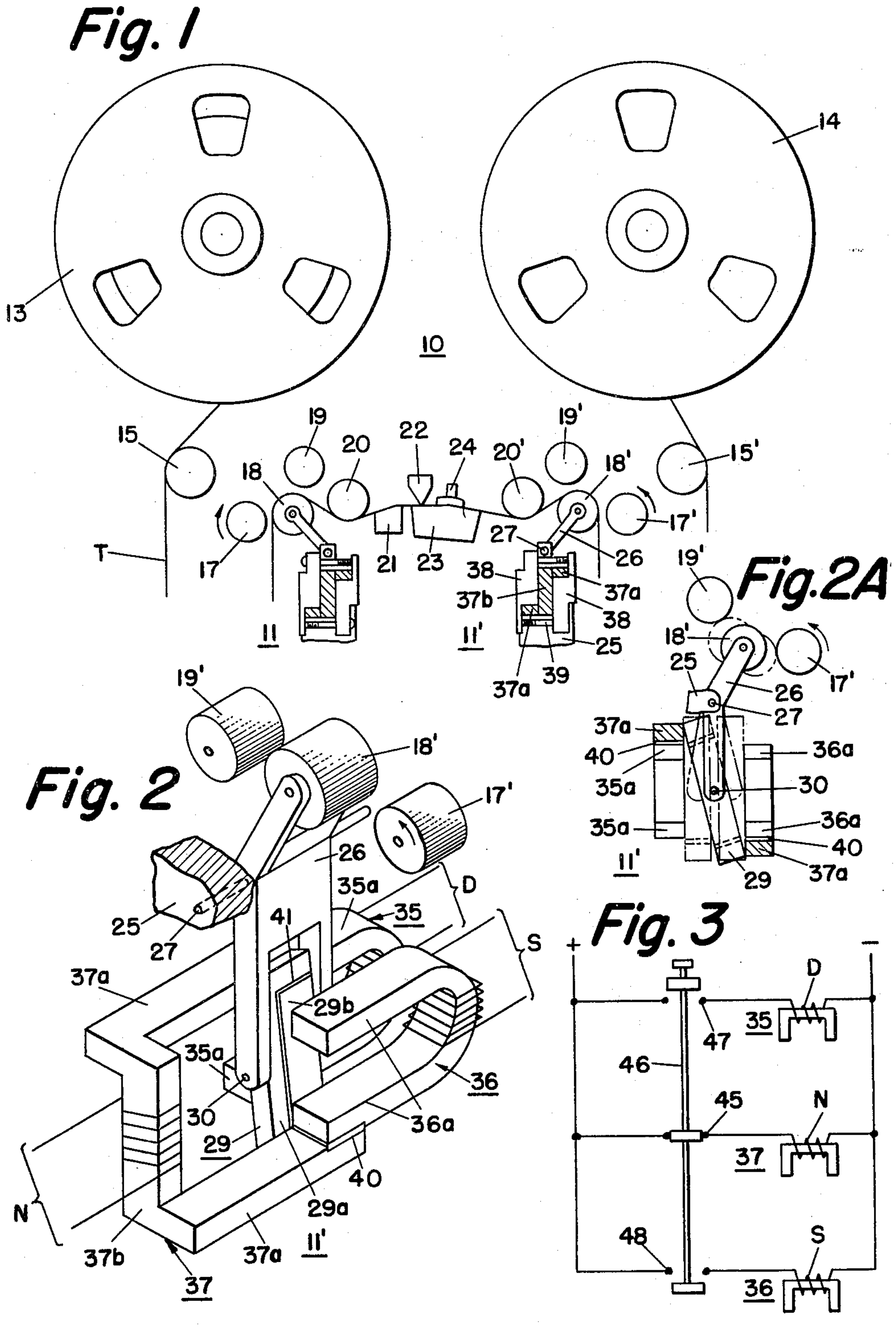
FIG. 1 is a diagrammatic view showing the present invention applied to a magnetic tape drive unit.
FIG. 2 is a perspective view of an electromagnetic actuator embodying the present invention.
FIG. 2A is an elevation, partly in section, of the electromagnetic actuator shown in FIG. 2.
FIG. 3 is a schematic wiring diagram of the actuator shown in FIGS. 2 and 2A.

Referring to FIG. 1, there is diagrammatically illustrated a magnetic tape drive unit 10 utilizing electromagnetic actuators 11 and 11' constructed in accordance with applicant's invention. The magnetic tape drive unit 10 includes a pair of reels 13 and 14, one of which serves as a supply for the tape T and the other of which serves as a take-up roll for the tape which is being unwound on the supply reel. The tape T is adapted to pass from reel 13 over a guide roll 15 into a vacuum column. The tape T then passes between a backward drive capstan 17 and a pressure roller 18. A forward stop capstan 19 is disposed on the opposite side of the tape T from the pressure roller 18. Thus, in the position illustrated, the pressure roller 18 is disposed in a neutral or intermediate position with respect to the backward drive capstan 17 and the forward stop capstan 19. The tape T, after leaving the pressure roller 18, passes under a suitable tape guide 20, over a tape cleaner 21 and between an erase head 22 and a magnetic head 23. A pressure pad 24 is disposed on the same side of the tape as the erase head 22 and directly opposite the magnetic head 23. The tape T then passes under another tape guide 20' and over another pressure roller 18' which is similar to the left-hand pressure roller 18. On the outside of the tape T from the pressure roller 18' are a backward stop capstan 19' and a forward drive capstan 17' which are similar to the forward stop capstan 19 and the backward drive capstan 17 respectively. The tape T then passes through a vacuum column and over a guide roll 15' to the take-up reel 14. The tape drive unit 10 as thus far described is of conventional type well-known in the art.

The drive capstans 17 and 17' are adapted to be driven in the direction of the arrows by suitable means, not shown. Depending upon the direction of the tape movement, the pressure rollers 18 and 18' are adapted to be moved from their intermediate positions, as illustrated, into engagement with either of their corresponding drive capstans 17 and 17' or stop capstans 19 and 19'. Such movement is derived from the novel electromagnetic actuators 11, 11' as later to be described more in detail. When the tape T is driven forward, i.e., from reel 13 to reel 14, the left-hand pressure roller 18 serves as an idler which is driven by the tape and occupies the intermediate position as shown in FIG. 1. The right-hand pressure roller 18' is moved into engagement with the forward drive capstan 17' by the corresponding actuator 11'. To stop the forward drive of the tape T, the actuator 11 is operated and moves the pressure roller 18 against the forward stop capstan 19 and the actuator 11' moves the pressure roller 18' away from the forward drive capstan 17'.

To reverse the movement of the tape T, the actuator 11 is energized to move pressure roller 18 against the backward drive capstan 17 and the actuator 11' maintains the pressure roller 18' in the intermediate position where it is shown in FIG. 1. To stop the movement of the tape in reverse or backward direction, the actuator 11' is energized to move the pressure roller 18' against the backward stop capstan 19' and the actuator 11 is energized to move the pressure roller 18 away from engagement with the backward drive capstan 17.

Referring to FIGS. 2 and 3, there is schematically illustrated one form of the three-position electromagnetic actuators 11 and 11'. It will be understood, of course, that the details of the actuators 11 and 11', FIG. 1, are the same, the only difference being that one is a left-hand unit, whereas the other is a right-hand unit. For that reason it is believed sufficient to describe the details of only one of the units, namely, the right-hand unit 11'. The actuator 11', FIGS. 1, 2, and 2A, includes a fixed support member 25 on which there is mounted an arm 26 by a pivot 27. The pivot 27 is adapted to pass through an intermediate portion of the arm 26 and the ends of the arm 26 are angularly disposed with respect to each other, with the outer end of the arm 26 being adapted to pivotally support the pressure roller 18' for movement between the drive capstan 17' and the stop capstan 19'. The opposite end of the pivoted arm 26 supports an armature 29 on a pivot 30. The opposite ends of the arm 26 preferably are bifurcated as shown in FIG. 2.

The movement of the armature 29 is adapted to be controlled by three electromagnets 35–37. Each of the electromagnets 35–37 includes a pair of poles **35*a*, 35*a*, 36*a*, 36*a*, and 37*a*, 37*a* respectively disposed on a substantially U-shaped core of soft iron or equivalent. The magnet 35 includes a coil or winding D which is adapted to be energized from a suitable source, such for example as a battery, not shown. When the coil D is energized, the poles 35*a*, 35*a* of magnet 35 will attract the armature 29 moving it against the poles 35*a*, 35*a* and completing a magnetic circuit therethrough. This causes the arm 26 to pivot in a clockwise direction about pivot 27 moving the pulley 18' against the drive capstan 17' as shown in FIG. 2A. The electromagnet 36 is provided with a winding or coil S which, when energized, is adapted to attract the armature 29 for movement against the poles 36*a*, 36*a* to complete a magnetic circuit therewith. This movement of the armature 29 causes the arm 26 to pivot in a counterclockwise direction, FIG. 2A, about the fixed pivot 27 thereby moving the pressure roller or moving pulley 18' for the tape T against the stop capstan 19'. To maintain the moving pulley 18' in a central or neutral position, the poles 37*a*, 37*a* of the magnet 37 are disposed on diagonally opposite sides of the armature 29 with one of the poles 37*a* being disposed adjacent one of the poles 35*a* of magnet 35 and the other pole 37*a* of magnet 37 being disposed adjacent a pole 36*a* of magnet 36. When the coils D and S of magnets 35 and 36 are deenergized and the coil N of magnet 37 is energized, the armature 29 will assume a diagonal position with the ends thereof in engagement with the poles 37*a*, 37*a* of magnet 37. Since the pivot 30 for the armature 29 is disposed centrally of the armature, the energization of coil N will cause rotational movement of armature 29. However, there will be no resulting pivotal movement of the arm 26. Thus the moving pulley 18' will maintain a central or neutral position between the drive capstan 17' and the stop capstan 19'**. Such neutral position has been illustrated in FIG. 2 and in full line in FIG. 2A with the stop and drive positions being illustrated in broken line in FIG. 2A.

While the core of the neutral magnet 37 may be formed from a single member, it is preferable from a construction standpoint to form the core from three members. The three members comprise the two pole members **37*a*, 37*a* and the interconnecting magnetic member 37*b*. Since the armature 29 is pivoted at its midpoint, there will be no resulting movement of the arm 26 regardless of which diagonal position is assumed by the armature 29. Thus, it will be seen that the poles 37*a*, 37*a* may be reversed with respect to the poles of magnets 35 and 36. For example, the upper pole 37*a* may be placed on the opposite side of the upper end of member 37*b* adjacent the upper pole 36*a* of magnet 36 and the bottom pole 37*a* may be moved to the opposite side of member 37*b* and adjacent the lower pole 35*a* of magnet 35. Such an arrangement is shown in FIG. 1. The poles 37*a*, 37*a* are adapted to be clamped against the outer ends of the interconnecting member 37*b* by means of a pair of non-magnetic blocks 38. The blocks 38 may be made from a hard plastic or other suitable material and are adapted to be maintained in clamping relation by means of a pair of bolts or screws 39**.

As may be seen in FIG. 2, the poles of the magnets 35, 36 and 37 are disposed in overlapping relation, i.e., one of the poles **37*a* overlaps one of the poles 35*a* and the other pole 37*a* overlaps one of the poles 36*a*. To separate the magnetic circuits of the overlapping poles, there is provided non-magnetic means such for example as a brass plate 40 disposed between each of the overlapping poles. Such separation of the magnetic circuits increases the efficiency thereof and tends to increase the speed of response of the armature 29. A similar arrangement may be employed in connection with the armature 29. As may be seen in FIG. 2, the armature can be separated into two parts axially of its pivot 30. The outer part 29*a* of the armature is adapted to engage the poles 37*a* of magnet 37 and complete the magnetic circuit therewith. The other part 29*b* of the armature 29 is adapted to engage the poles 35*a* of magnet 35 or the poles 36*a* of magnet 36 and complete magnetic circuits therewith. The two parts 29*a* and 29*b* of the armature 29 have been illustrated as separated from each other by non-magnetic means such as a U-shaped brass spacer member 41**.

A suitable electric circuit for selectively energizing the coils D, S and N of magnets 35–37 has been schematically illustrated in FIG. 3. The coils D, N and S of the respective magnets 35, 37, 36 have been illustrated as connected across a suitable source of supply, such for example as a battery, and each coil is in circuit with a set of contacts. The neutral coil N for magnet 37 is in series with contacts 45 which have been closed by a movable contactor 46. The contacts 47 for drive coil D of magnet 35 and the contacts 48 for stop coil S of magnet 36 are in open position. Thus only the magnet 37 is energized and the armature 29 assumes a diagonal position as shown in FIG. 2, such position corresponding to the central or neutral position of the arm 26 and pressure roller 18'. To move the pressure roller 18' against the drive capstan 17', FIGS. 1 and 2A, the contactor 46, FIG. 3, is moved downwardly thereby opening contacts 45 to deenergize the neutral coil N of magnet 37 and closing contacts 47 to energize the drive coil D of magnet 35. When it is desired to move the tape pulley 18' into engagement with the stop capstan 19', FIG. 2A, the contactor 46, FIG. 3, is moved upwardly to a position where the contacts 48 are closed and contacts 45 and 47 are both opened. This deenergizes the drive coil D and the neutral coil N and energizes the stop coil S of electromagnet 36 thereby attracting the armature 29 against the poles **36*a* and rotating the arm 26 about pivot 27 in a counterclockwise direction, FIG. 2A. The contacts on the movable contactor 46 in FIG. 3 are so disposed that each time it is moved from its uppermost to its lowermost position the contacts 45 will be closed and the neutral coil N of magnet 37** will be energized.

Figure 4:
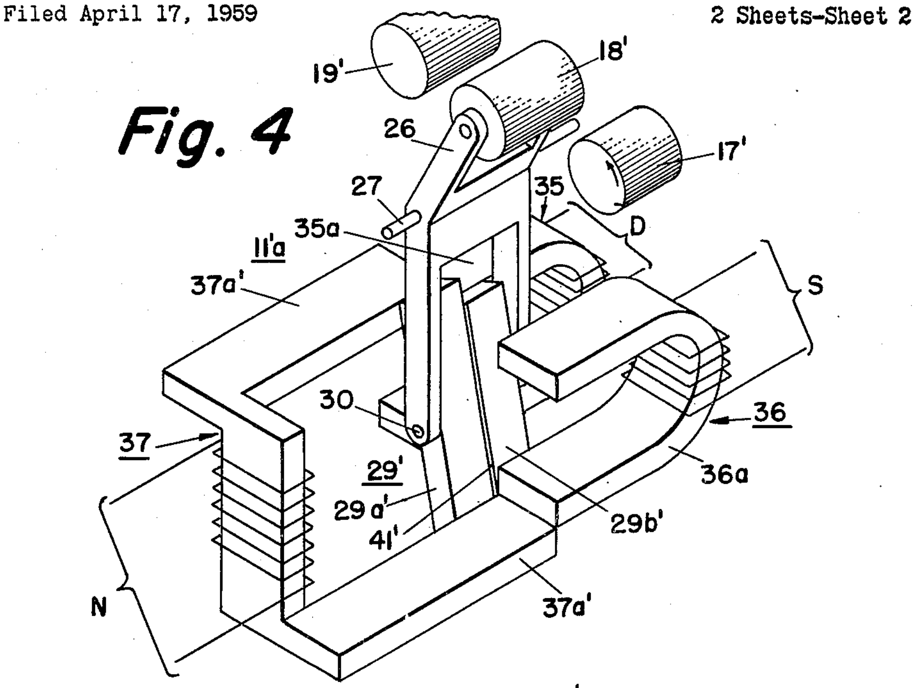
FIG. 4 is a perspective view showing a modification of the electromagnetic actuator with the poles in butt-offset relation.

Referring to FIG. 4, there has been shown an electromagnetic actuator **11'*a* embodying a form of the invention where the poles of the magnet 37** have been moved axially of the armature with respect to the poles of the magnets, 35 and 36. The poles 37a', 37a' do not overlap the corresponding poles 35a and 36a of magnets 35 and 36 but instead assume a butt-offset relation therewith. Thus it will be seen that the pole faces of the magnets 35, 36 and 37 are substantially co-planar. The armature 29' has been separated into two pieces, 29a' and 29b' with member 29a' being disposed to the same side of the plane as the poles 37a' and the armature member 29b' being disposed to the same side of the plane as the poles 35a and 36a of magnets 35 and 36. The armature members 29a' and 29b' are secured to each other but are separated by suitable nonmagnetic means such as a brass spacer 41'. The length of the armature section 29a' corresponds with the spacing of the poles 37a' of magnet 37 and the length of the armature section 29b' corresponds with the spacing of the poles 36a on magnet 36 and the spacing of the poles 35a on magnet 35. Thus when electromagnet 37 is energized, the armature 29' will assume a diagonal position with section 29a' engaging the respective poles 37a', 37a' whereas when either of electromagnets 35 or 36 are energized, the armature 29' will assume a parallel position and armature section 29b' will engage the corresponding poles 35a, 35a or 36a, 36a respectively.

Figure 5:
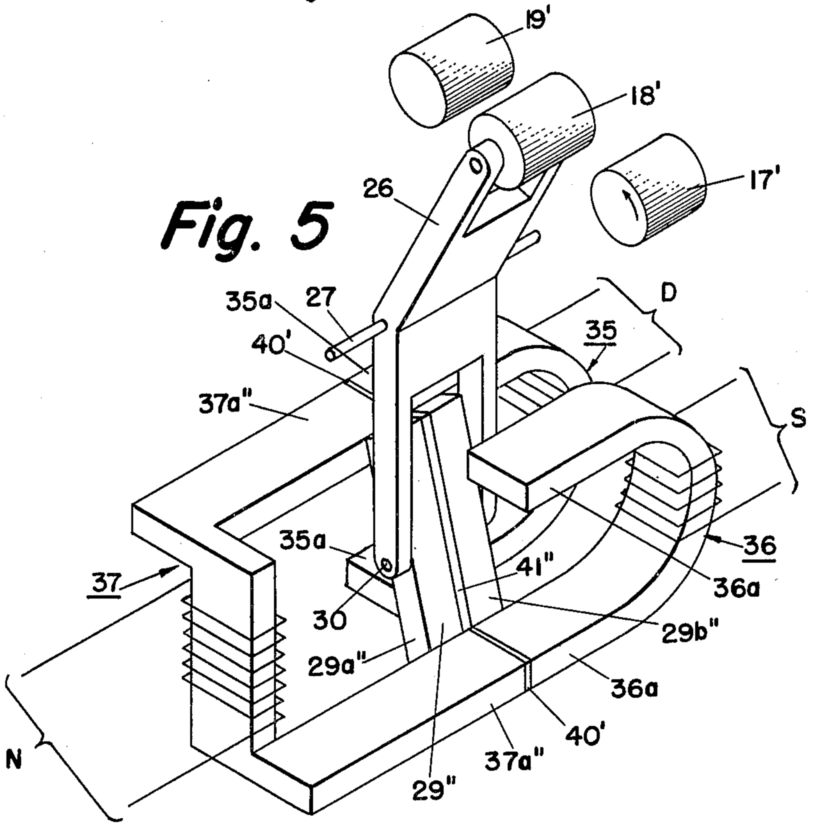
FIG. 5 is a perspective view of a modification of the invention showing the poles in butt relation.

Another arrangement of the electromagnets 35–37 is illustrated in FIG. 5. In this form of the invention, the poles 37a'' of magnet 37 have been illustrated in abutting relation with the corresponding poles 35a and 36a of electromagnets 35 and 36. The pole faces are no longer offset as in FIG. 4, but instead are in line with each other. In order to isolate the magnetic circuit of electromagnet 37 from electromagnets 35 and 36, the poles 37a'' are spaced from the corresponding poles 35a and 36a by non-magnetic means illustrated as brass plates or spacer members 40'. The spacers 40' serve the same function as the spacers 40 shown in FIG. 2. The armature 29'' is similar to the armature 29' shown in FIG. 4. However, both halves 29a'' and 29b'' are of the same length since the spacing between the pairs of poles of each electromagnet 35–37 is the same. The armature sections 29a'' and 29b'' are separated axially from each other by a non-magnetic spacer 41'' which is similar to the brass plate 41' shown in FIG. 4. The brass plates 40' and 41'' all are in the same plane and thus the armature section 29a'' will cooperate with poles 37a'' to complete the magnetic circuit therewith while the armature section 29b'' will cooperate with either the poles 36a, 36a of magnet 36 or 35a, 35a of magnet 35 in completing a magnetic circuit therewith.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A three-position electromagnetic actuator comprising a support, an arm pivoted intermediate the ends thereof to said support, an armature pivoted intermediate the ends thereof to said arm at a location spaced from the pivotal connection of said arm to said support, two pairs of magnetic poles with one pair disposed on either side of said armature providing two separate magnetic circuits, means for maintaining said armature in a diagonal position comprising an additional pair of magnetic poles, one pole of said additional pair being disposed adjacent each of said first-named pairs of magnetic poles and providing a third separate magnetic circuit, said additional pair of magnetic poles having an electrical winding for energization to maintain said arm in a central position, and electrical means disposed on said first-named pairs of magnetic poles and selectively energized to move said armature into engagement with either pair of said first-named pairs of magnetic poles to move said arm about its pivot in opposite directions to positions on either side of said central position.

2. A three-position electromagnetic actuator according to claim 1 wherein each of said pairs of poles comprises a substantially U-shaped core.

3. A three-position electromagnetic actuator according to claim 2 wherein said U-shaped core of said additional pair of magnetic poles comprises three individual members, two of which are pole members disposed in different planes on diagonally opposite sides of said armature and the third member of which magnetically interconnects said two pole members.

4. A three-position electromagnetic actuator according to claim 1 wherein said poles of said additional pair are arranged in overlapping relation with respect to a pole of each of said first-named pairs.

5. A three-position electromagnetic actuator according to claim 1 wherein said poles of said additional pair are disposed in abutting relation with respect to a pole of each of said first-named pairs.

6. A three-position electromagnetic actuator according to claim 1 wherein said poles of said additional pair are disposed in butt-offset relation with respect to a pole of each of said first-named pairs.

7. A three-position electromagnetic actuator according to claim 4 wherein said overlapping poles are separated by non-magnetic spacer means.

8. A three-position electromagnetic actuator according to claim 7 wherein said armature is divided into sections disposed axially of its pivot and said sections are separated by non-magnetic means.

9. A three-position electromagnetic actuator according to claim 1 wherein said poles of said additional pair of poles are separated from the adjacent poles of said first-named pairs by non-magnetic means, and said armature comprises a pair of sections disposed axially of the pivot for said armature, said sections being separated by non-magnetic means.

10. A three-position electromagnetic actuator comprising a support, an arm pivoted intermediate the ends thereof to said support, an armature pivoted intermediate the ends thereof to said arm at a location spaced from the pivotal connection of said arm to said support, two pairs of magnetic poles with one pair disposed on either side of said armature providing two separate magnetic circuits, means for maintaining said armature in a diagonal position comprising an additional pair of magnetic poles, one pole of said additional pair being disposed on diagonally opposite sides of said armature adjacent a pole of said first-named pairs of poles in butt-offset relation and providing a third separate magnetic circuit, said additional pair of magnetic poles having an electrical winding for energization to maintain said arm in a central position, said armature being divided into two sections disposed axially of its pivot, non-magnetic means disposed between said armature sections and substantially co-planar with the ends of all of said poles, one section of said armature having a length corresponding with the spacing between the poles of said first-named pairs of poles, said other armature section having a length corresponding with the spacing between said additional pair of poles, and electrical means on said first-named pairs of magnetic poles and selectively energized to move said armature into engagement with either of said first-named pairs of magnetic poles to move said arm about its pivot in opposite directions to positions on either side of said central position.

11. A three-position electromagnetic actuator comprising an arm having a fixed pivot intermediate the ends thereof, an armature pivoted intermediate the ends thereof to said arm at a location spaced from said fixed pivot, two pairs of magnetic poles with one pair disposed on either side of said armature providing two separate magnetic circuits, means for moving said arm to a central position comprising an additional pair of magnetic poles diagonally disposed on opposite sides of said armature and adjacent said first-named pairs of poles providing a third separate magnetic circuit, said additional pair of poles having an electrical winding for energization to maintain said armature in a diagonal position corresponding to said diagonal position of said additional pair of poles, and electrical means disposed on said first-named pairs of poles and selectively energized to move said armature into engagement with either pair of said first-named pairs of magnetic poles to move said arm about said fixed pivot in opposite directions to predetermined positions on either side of said central position.

References Cited in the file of this patent

UNITED STATES PATENTS

| | | |
|---|---|---|
| 2,792,217 | Weidenhammer et al. | May 14, 1957 |
| 2,803,968 | Van Tilburg | Aug. 27, 1957 |
| 2,877,012 | Angel et al. | Mar. 10, 1959 |